(12) United States Patent
Chang

(10) Patent No.: US 9,140,932 B2
(45) Date of Patent: Sep. 22, 2015

(54) LIQUID CRYSTAL DISPLAY AND MANUFACTURING METHOD THEREOF

(75) Inventor: Kuangyao Chang, Shenzhen (CN)

(73) Assignee: SHENZHEN CHINA STAR OPTOELECTRONICS TECHNOLOGY CO. LTD., Shenzhen (CN)

(*) Notice: Subject to any disclaimer, the term of this patent is extended or adjusted under 35 U.S.C. 154(b) by 3 days.

(21) Appl. No.: 13/577,909

(22) PCT Filed: Apr. 28, 2012

(86) PCT No.: PCT/CN2012/074907
§ 371 (c)(1),
(2), (4) Date: Aug. 9, 2012

(87) PCT Pub. No.: WO2013/143201
PCT Pub. Date: Oct. 3, 2013

(65) Prior Publication Data
US 2014/0176865 A1 Jun. 26, 2014

(30) Foreign Application Priority Data
Mar. 31, 2012 (CN) .......................... 2012 1 0091654

(51) Int. Cl.
*G02F 1/1335* (2006.01)
*F21V 8/00* (2006.01)
(Continued)

(52) U.S. Cl.
CPC ........ *G02F 1/133615* (2013.01); *G02B 6/0086* (2013.01)

(58) Field of Classification Search
CPC .............. G02F 1/133615; G02F 1/133606; G02F 2001/133607; G02F 1/133611; G02F 1/133504; G02F 2001/133507; G02B 6/0036; G02B 6/0046; G02B 6/0051; G02B 6/0028; G02B 6/0043; G02B 6/0018; G02B 6/0016; G02B 6/003; G02B 5/0231; G02B 5/02; G02B 5/0215; G02B 5/0221; G02B 6/00; G02B 6/0053; G02B 6/0061; G02B 6/0021; G02B 5/045; G02B 6/0088; G02B 6/002; G02B 6/0091; G02B 6/009; G02B 6/0035; G02B 6/0038; G02B 6/0086; G02B 6/0048; G02B 6/0025; G02B 6/0023; G02B 6/0011; G02B 6/0033; G02B 5/00; G02B 6/005; G02B 6/053
See application file for complete search history.

(56) References Cited

U.S. PATENT DOCUMENTS 6,322,225 B1 * 11/2001 Koike ........................... 362/620
6,738,116 B2    5/2004 Sasagawa et al.
(Continued)

FOREIGN PATENT DOCUMENTS

| CN | 1356582 | 7/2002 |
| CN | 2613768 | 4/2004 |
| CN | 2627535 | 7/2004 |
| CN | 102003641 | 4/2011 |
| KR | 20080048622 | 6/2008 |

*Primary Examiner* — Paisley L Arendt
*Assistant Examiner* — Angela Davison
(74) *Attorney, Agent, or Firm* — Mark M. Friedman

(57) ABSTRACT

The present invention relates to a liquid crystal display (LCD) and a manufacturing method thereof; the LCD comprises a backlight module and a display panel; an included angle $\Theta_{pb}$ is between a normal direction of a light emission surface of the backlight module and a normal direction of a light emission surface of the display panel. By changing the relative positions of the display panel and the backlight module, the LCD and the manufacturing method thereof of the present invention decrease the phenomenon of asymmetrical light field in the LCD.

8 Claims, 3 Drawing Sheets

(51) Int. Cl.
 *F21V 7/04* (2006.01)
 *G09F 13/04* (2006.01)
 *G09F 13/08* (2006.01)
 *G02B 6/10* (2006.01)
 *G02B 6/00* (2006.01)
 *G02B 6/12* (2006.01)

(56) References Cited

U.S. PATENT DOCUMENTS 8,136,975 B2 * 3/2012 Shiau et al. .................. 362/606
2011/0051048 A1 * 3/2011 Kim ............................... 349/67

* cited by examiner

LIQUID CRYSTAL DISPLAY AND MANUFACTURING METHOD THEREOF

FIELD OF THE INVENTION

The present invention relates to the field of the liquid crystal display (LCD) technique, more particularly to a LCD and a manufacturing method thereof.

BACKGROUND OF THE INVENTION

With the development of technology, a variety of electronic products have become daily necessities, wherein the display is an important component of multimedia electronic products. Also, the LCD has advantages of energy saving, non-radiation, small volume, low power consumption, compactness, planar rectangularity, high definition (HD) and stable image quality, so as to gradually substitutes the traditional cathode ray tube (CRT) display and be widely applied to electronic products, such as cell phone, screen, digital television, laptop and so on.

According to the incident position of the light source, a backlight module can be classified into the side-light type and direct-light type. In order to meet requirements of energy saving and aesthetic (i.e. thinness and narrow frame) of the LCD, the side-light type gradually becomes the primary product in the market. However, the incident manner of the backlight module of this type has an inherent defect, as shown in FIG. 1, that the emitting light field of a light emission surface 101 of the light guide plate is asymmetrical to a normal direction A2 of the light emission surface 101, so that it causes that a light emission direction A1 corresponding to the maximum luminosity of the light emission surface 101 is not parallel to the normal direction A2 of the light emission surface. Thereby, it overextend the light emission angle $\Theta_{max}$ (i.e. the included angle between the light emission direction A1 corresponding to the maximum luminosity and the normal direction A2 to the light emission surface 101), so as to influence the display quality of the corresponding LCD.

In order to overcome the foregoing defect, the LCD manufacturer generally attaches an optical film which can change the light filed onto the side of the light emission surface of the light guide plate to rectify the biased light field back to the front view angle of the corresponding display panel. However, if wanting to achieve a better compensation effect, it has to attach the combination of various optical films, which results in increasing manufacturing costs of the backlight module.

Therefore, it is necessary to provide a LCD and a manufacturing method thereof to solve the problems of the traditional technique.

SUMMARY OF THE INVENTION

The present invention provides a LCD and a manufacturing method thereof for decreasing the phenomenon of asymmetrical light field in the LCD by changing the relative positions of a display panel and a backlight module so as to solve the worse display quality resulting from the phenomenon of asymmetrical light filed in the LCD with the traditional side-light type backlight module.

The present invention relates to a LCD, comprising a backlight module and a display panel, wherein an included angle $\Theta_{pb}$ is between the normal direction of the light emission surface of the backlight module and the normal direction of the light emission surface of the display panel; the value of the included angle $\Theta_{pb}$ is determined by a light emission angle $\Theta_{max}$, wherein the light emission angle $\Theta_{max}$ is the included angle between the corresponding light emission direction of the maximum luminosity of the light emission surface of the backlight module and the normal direction of the light emission surface of the backlight module; an included angle $\Theta_{mp}$ between the corresponding light emission direction of the maximum luminosity of the light emission surface of the backlight module and the normal direction of the light emission surface of the display panel is $\Theta_{max}-\Theta_{pb}$; the included angle $\Theta_{pb}$ is less than or equal to the light emission angle $\Theta_{max}$.

In the LCD of the present invention, the included angle $\Theta_{pb}$ is equal to the light emission angle $\Theta_{max}$.

In the LCD of the present invention, the value of the included angle $\Theta_{pb}$ is determined by the light emission angle $\Theta_{max}$ and the thickness of the backlight module.

In the LCD of the present invention, the backlight module further comprises an optical film arranged on the light emission surface of the backlight module; and the optical film comprise a diffuser film, a dual brightness enhancement film, a prism film, a microlens film and/or a lenticule film.

The present invention further relates to a LCD, comprising a backlight module and a display panel, wherein an included angle $\Theta_{pb}$ is between the normal direction of the light emission surface of the backlight module and the normal direction of the light emission surface of the display panel.

In the LCD of the present invention, the value of the included angle $\Theta_{pb}$ is determined by a light emission angle $\Theta_{max}$, wherein the light emission angle $\Theta_{max}$ is the included angle between the corresponding light emission direction of the maximum luminosity of the light emission surface of the backlight module and the normal direction of the light emission surface of the backlight module.

In the LCD of the present invention, an included angle $\Theta_{mp}$ between the corresponding light emission direction of the maximum luminosity of the light emission surface of the backlight module and the normal direction of the light emission surface of the display panel is $\Theta_{max}-\Theta_{pb}$.

In the LCD of the present invention, the included angle $\Theta_{pb}$ is less than the light emission angle $\Theta_{max}$.

In the LCD of the present invention, the included angle $\Theta_{pb}$ is equal to the light emission angle $\Theta_{max}$.

In the LCD of the present invention, the value of the included angle $\Theta_{pb}$ is determined by the light emission angle $\Theta_{max}$ and the thickness of the backlight module.

In the LCD of the present invention, the backlight module further comprises optical film arranged on the light emission surface of the backlight module; and the optical film comprise a diffuser film, a dual brightness enhancement film, a prism film, a microlens film and/or a lenticule film.

The present invention further relates to a method for manufacturing a LCD, the LCD comprises a backlight module and a display panel; the method for manufacturing the LCD comprises a step of: (A) determining an included angle $\Theta_{pb}$ between the normal direction of the light emission surface of the backlight module and the normal direction of the light emission surface of the display panel by a light emission angle $\Theta_{max}$; wherein the light emission angle $\Theta_{max}$ is the included angle between the corresponding light emission direction of the maximum luminosity of the light emission surface of the backlight module and the normal direction of the light emission surface of the back light module.

In the method for manufacturing a LCD of the present invention, before the step (A) it further comprises a step of: (A1) determining the included angle $\Theta_{max}$ by the luminosity of each light emission direction of the light emission surface of the backlight module.

In the method for manufacturing a LCD of the present invention, an included angle $\Theta_{mp}$ between the corresponding light emission direction of the maximum luminosity of the light emission surface of the backlight module and the normal direction of the light emission surface of the display panel is $\Theta_{max}-\Theta_{pb}$.

In the method for manufacturing a LCD of the present invention, the included angle $\Theta_{pb}$ is less than the light emission angle $\Theta_{max}$.

In the method for manufacturing a LCD of the present invention, the included angle $\Theta_{pb}$ is equal to the light emission angle $\Theta_{max}$.

In the method for manufacturing a LCD of the present invention, the value of the included angle $\Theta_{pb}$ is determined by the light emission angle $\Theta_{max}$ and the thickness of the backlight module.

In the method for manufacturing a LCD of the present invention, the method for manufacturing a LCD further comprises a step of: arranging an optical film on the light emission surface of the backlight module; the optical film comprise a diffuser film, a dual brightness enhancement film, a prism film, a microlens film and/or a lenticule film.

The LCD and the manufacturing method thereof of the present invention have the following benefits: by changing the relative positions of the display panel and the backlight module, the phenomenon of asymmetrical light field in the LCD with the side-light type backlight module is decreased, so that it solves the technical problems of worse display quality resulting from the phenomenon of asymmetrical light field in the LCD with the traditional side-light type backlight module.

For the present invention described above will be more apparent, the following specific preferable embodiment with the companying drawings will be elaborated as follows:

DETAILED DESCRIPTION OF THE PREFERRED EMBODIMENTS

Figure 1:
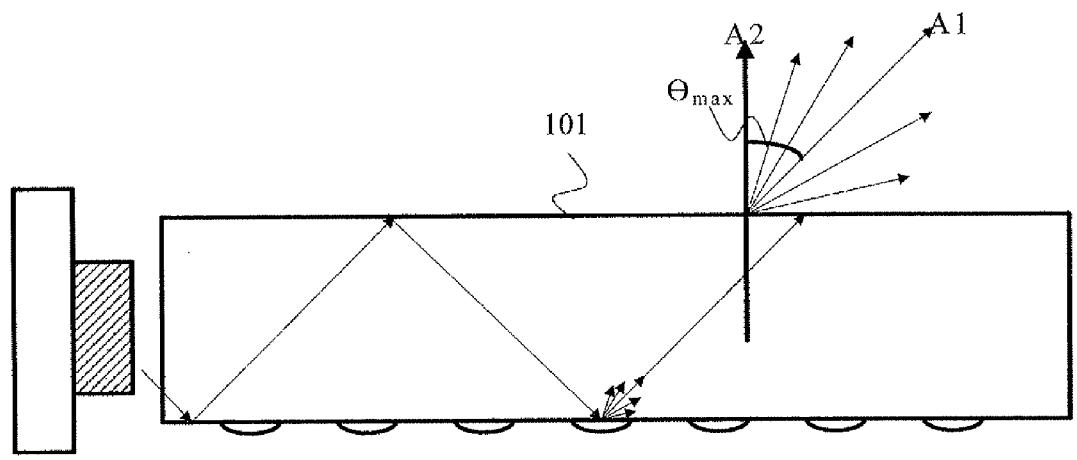
FIG. 1 is a structural schematic view of a traditional side-light type backlight module.

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, and etc., are only directions by referring to the accompanying drawings. Therefore, the used directional terms are used to describe and understand the present invention, but the present invention is not limited thereto.

In the figures, the similar structural unit is designated by the same reference numerals.

Figure 2:
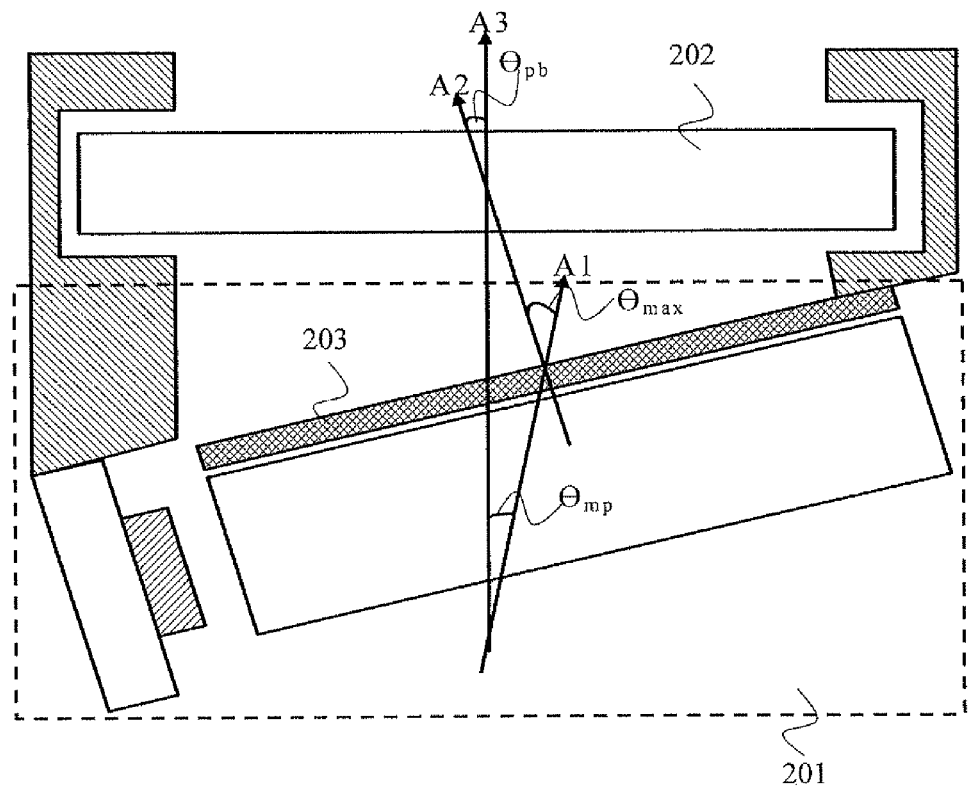
FIG. 2 is a structural schematic view according to a first preferred embodiment of a LCD of the present invention.

As shown in FIG. 2, a structural schematic view according to a first preferred embodiment of a LCD of the present invention is illustrated. The LCD comprises a backlight module 201 and a display panel 202. In this embodiment, an included angle $\Theta_{pb}$ is between the normal direction A2 of the light emission surface of the backlight module 201 and the normal direction A3 of the light emission surface of the display panel 202; the value of the included angle $\Theta_{pb}$ is determined by a light emission angle $\Theta_{max}$; an included angle $\Theta_{mp}$, $\Theta_{max}-\Theta_{pb}$, is between the corresponding light emission direction of the maximum luminosity of the light emission surface of the backlight module 201 and the normal direction of the light emission surface of the display panel 202; the light emission angle $\Theta_{max}$ is the included angle between the corresponding mission direction of the maximum luminosity of the light emission surface of the backlight module 201 and the normal direction of the light emission surface of the backlight module 201.

When operating the LCD of the present invention, as shown in FIG. 2, the corresponding light emission direction of the maximum luminosity of the light emission surface of the backlight module 201 is A1; the normal direction of the light emission surface of the backlight module 201 is A2; and the normal direction of the light emission surface of the display panel 202 is A3, so that the included angle between A1 and A2 is $\Theta_{max}$; the included angle between A1 and A3 is $\Theta_{mp}$; and the included angle between A2 and A3 is $\Theta_{pb}$. The included angle $\Theta_{max}$ can be determined by measuring each direction of the light emission surface of the backlight module 201, or by empirical values.

As shown in the figure, the present invention arranges the included angle $\Theta_{pb}$ by adjusting the relative positions of the backlight module 201 and the display panel 202 so as to accord the corresponding light emission direction A1 of the maximum luminosity of the light emission surface of the backlight module 201 with the normal direction A3 of the light emission surface of the display panel 202 as much as possible, that is, to minimize the included angle $\Theta_{mp}$ as much as possible (after fixing the included angle $\Theta_{pb}$ and the light emission angle $\Theta_{max}$, the value of the included angle $\Theta_{mp}$ is $(\Theta_{max}-\Theta_{pb})$; meanwhile, the directions A1, A2 and A3 are on the same plane), so that the included angle $\Theta_{max}$ would not influence the light emission effect of the display panel 202. Because after determining the light emission angle $\Theta_{max}$, with the increase of the included angle $\Theta_{pb}$ (generally, it does not exceed $\Theta_{max}$), the inclination of the backlight module 201 results in its thickening along the normal direction of the light emission surface of the display panel 202, which is adverse to the requirement of the thin LCD. Therefore, it is necessary to consider the light emission angle $\Theta_{max}$ and the thickness of the backlight module 201 when arranging the included angle $\Theta_{pb}$ to minimize the included angle $\Theta_{mp}$ as much as possible under the extent of the backlight module 201's thickness. The included angle $\Theta_{pb}$ is preferably less than or equal to the light emission angle $\Theta_{max}$; if possible, the included angle $\Theta_{pb}$ is preferably equal to the mission angle $\Theta_{max}$ (at this moment, it can achieve the best performance).

In this embodiment, an optical film 203 is arranged on the backlight module 201; the optical film 203 can be for example a diffuser film (DF), a dual brightness enhancement film (DBEF), a prism film, a microlens (ML) film, a lenticule (LTC) film or any combination thereof, and arranged on the light emission surface of the light guide plate of the backlight module 201 to improve the light emission effect of the backlight module 201.

Figure 3:
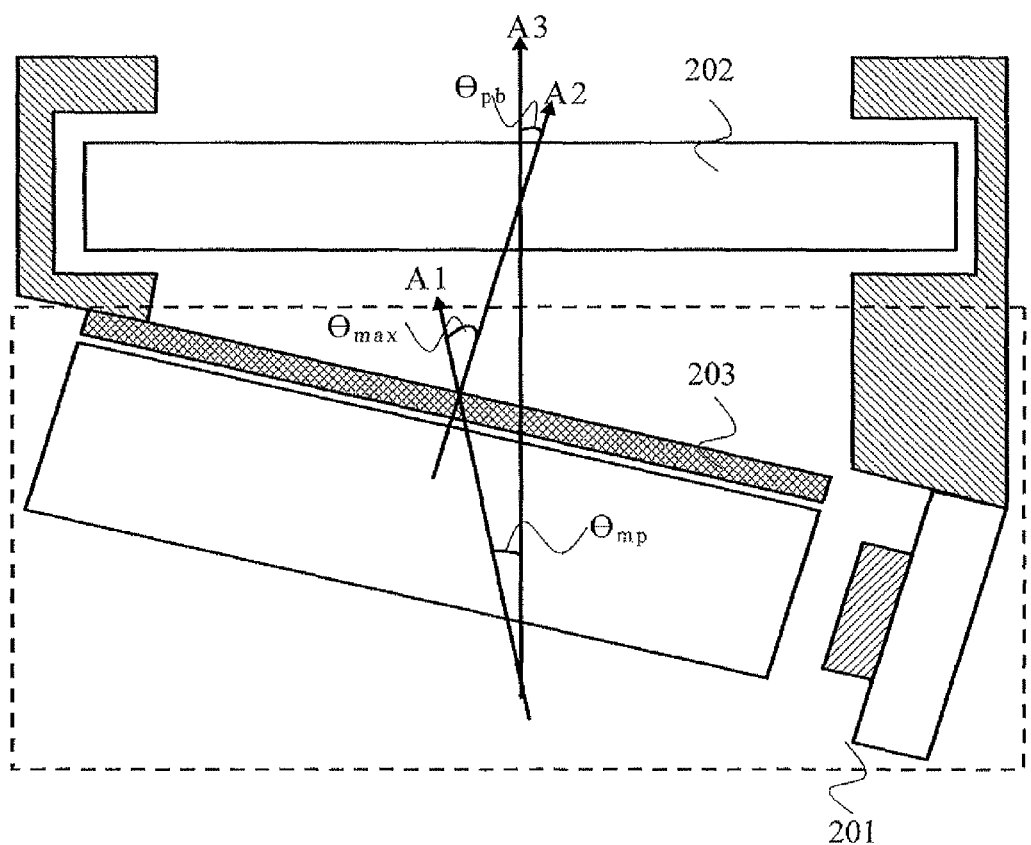
FIG. 3 is a structural schematic view according to a second preferred embodiment of a LCD of the present invention.

As shown in FIG. 3, a structural schematic view according to a second preferred embodiment of a LCD of the present invention is illustrated. The difference between this embodiment and the first preferred embodiment is the different position of the light source, which results in a different direction of the included angle $\Theta_{max}$, so that the relative positions of the backlight module and the display panel are different. However, the LCD structure of this embodiment and the effect thereof are similar to or the same as the first embodiment mentioned above, so the specific arrangement of the interior structure of the backlight module does not limit the scope of protection in the present invention.

Figure 4:
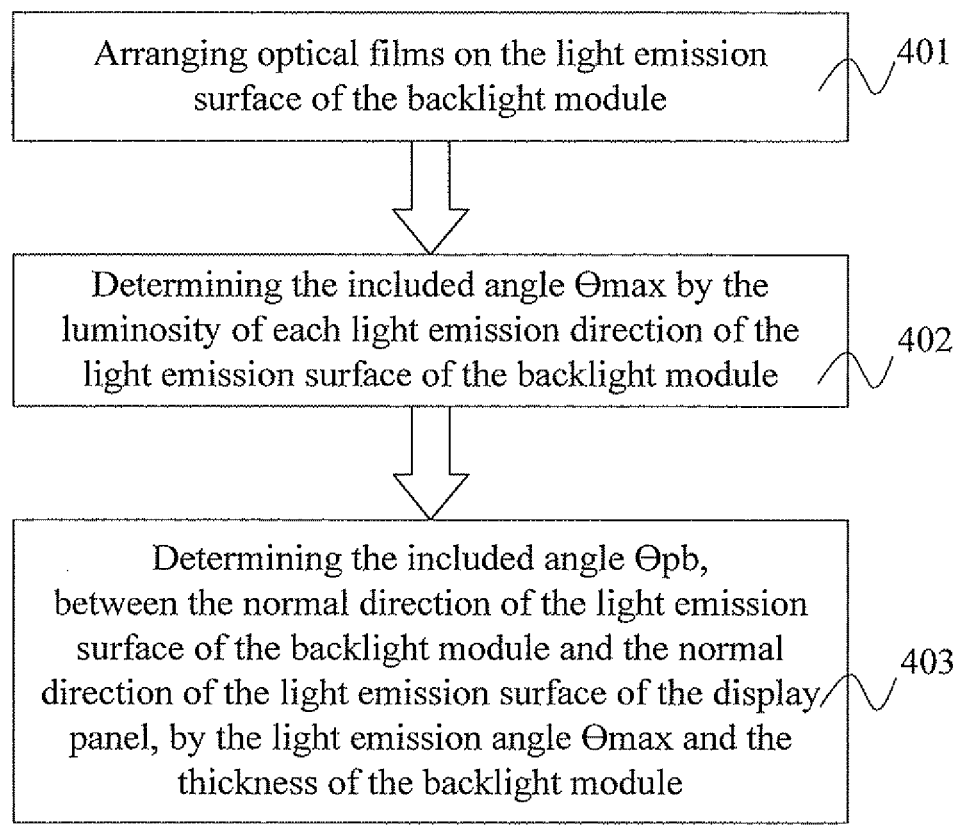
FIG. 4 is a flow chart according to a preferred embodiment of a LCD of the present invention.

As shown in FIG. 4, a flow charts according to the preferred embodiment of a LCD of the present invention and begins at a step 401:

In the step 401, an optical film is arranged on the light emission surface of a backlight module;

Subsequently, in a step 402, a light emission angle $\Theta_{max}$ is determined by the luminosity of each direction of the light emission surface of the backlight module, wherein the light emission angle $\Theta_{max}$ is the inclined angle between the corresponding light emission direction of the maximum luminosity of the light emission surface of the backlight module and the normal direction of the light emission surface of the backlight module.

Finally, in a step 403, an included angle $\Theta_{pb}$ between the normal direction of the light emission surface of the backlight module and the normal direction of the light emission surface of the display panel is determined by the light emission angle $\Theta_{max}$ and the thickness of the backlight module. An included angle $\Theta_{mp}$ between the corresponding light emission direction of the maximum luminosity of the light emission surface of the backlight module and the normal direction of the light emission surface of the display panel is $\Theta_{max}-\Theta_{pb}$.

The specific description of the steps of this method is described more detailed, as follows:

In the step 401, the optical film is firstly arranged on the light emission surface of the backlight module, which can be a DF, a DBEF, a prism film, a ML film, a LTC film or any combination thereof, and arranged on the light emission surface of the light guide plate of the backlight module to improve the light emission effect of the backlight module. After the optical film is arranged, the asymmetrical degree of the light field of the backlight module is initially determined, so that the next step can be executed.

In the step 402, the luminosity of each light emission direction of the light emission surface of the backlight module is measured (or can be obtained by empirical values), so that the asymmetrical degree of the light field of the backlight module is understood. The light emission angle corresponding to the maximum luminosity of each light emission direction is defined as the light emission angle $\Theta_{max}$ (i.e. the luminosity of the light emission direction of the backlight module to which the angle $\Theta_{max}$ corresponds is maximum), and the larger the light emission $\Theta_{max}$, the more asymmetrical the light filed is, and the greater the effect to the display quality of the LCD. Subsequently, the next step is executed.

In the step 403, by adjusting the relative positions of the backlight module and the display panel (i.e. the included angle $\Theta_{pb}$ between the normal direction of the light emission surface of the backlight module and the normal direction of the light emission surface of the display panel), the corresponding light emission direction of the maximum luminosity of the backlight module is in accord with the normal direction of the light emission surface of the display panel as much as possible, even though the smaller the included angle $\Theta_{mp}$, between the corresponding light emission direction of the maximum luminosity of the light emission surface of the backlight module and the normal direction of the light emission surface of the display panel, the better (after fixing the included angle $\Theta_{pb}$ and the light emission angle $\Theta_{max}$, the value of the included angle $\Theta_{mp}$ is ($\Theta_{max}-\Theta_{pb}$)), so that the included angle $\Theta_{max}$ would not influence the light emission effect of the display panel. Because after determining the light emission angle $\Theta_{max}$ in step 402, with the increase of the included angle $\Theta_{pb}$ (generally, it does not exceed $\Theta_{max}$), the inclination of the backlight module results in its thickening along the normal direction of the light emission surface of the display panel, which is adverse to the requirement of thinness of the LCD. Therefore, it is necessary to consider the light emission angle $\Theta_{max}$ and the thickness of the backlight module when arranging the included angle $\Theta_{pb}$ to minimize the included angle $\Theta_{mp}$ as much as possible under the extent of the backlight module's thickness. Preferably, the included angle $\Theta_{pb}$ is less than or equal to the light emission angle $\Theta_{max}$; if possible, the included angle $\Theta_{pb}$ is preferably equal to the light emission angle $\Theta_{max}$ (at this moment, it can achieve the best performance).

The benefits of the LCD and the manufacturing method thereof of the present invention are illustrated in the following Table 1.

TABLE 1

|  | Maximum Luminosity/ Front View Angle Luminosity | Light emission Angle $\Theta_{max}$ | Light emission Gain of the Optical Film without the Included Angle $\Theta_{pb}$ | Light emission Gain of the Optical Film with the Included Angle $\Theta_{pb}$ |
| --- | --- | --- | --- | --- |
| DF | 134.5% | 29 | 65.3% | 87.8% |
| DF × 2 | 107.2% | 15 | 80.3% | 86.1% |
| DF + ML | 104.4% | 10 | 89.6% | 93.5% |
| ML × 2 | 102.9% | 8 | 95.4% | 98.2% |
| LTC + DF | 106.4% | 10 | 91.5% | 97.3% |
| LTC + ML | 103.0% | 7 | 98.9% | 101.9% |

Table 1 shows optical light emission gains of backlight modules with six different optical films before/after using the device and the method of the present invention. The light emission angle $\Theta_{max}$ only with a DF is up to 29°; meanwhile, the ratio of the maximum of each front view angle luminosity and the front view angle is up to 134.5%. Thus, before arranging the relative positions between the backlight module and the display panel in the device and the method of the present invention, the light emission gain of the optical film is only up to 65.3%, but after arranging the relative positions between the backlight module and the display panel in the device and the method of the present invention, since the included angle $\Theta_{mp}$ between the light emission direction of the maximum luminosity of the light emission surface of the backlight module and the normal direction of the light emission surface of the display panel is ($\Theta_{max}-\Theta_{pb}$) equal to 0 (the thickness factor of the backlight module is not considered herein), the light emission gain of the optical film is up to 87.8%, with 22.5% increase, even larger than the light emission gain of the regular arrangement with two DFs. The light emission ratios of the other five optical films after arranging are 5.8%, 3.9%, 2.8%, 5.8% and 3%, respectively, which are proportional to the corresponding light emission angle $\Theta_{max}$. Therefore, according to Table 1, in the LCD and the manufacturing method thereof of the present invention, the larger the light emission angle $\Theta_{max}$ is, the better effect the backlight module improves, so that the biased light field can be compensated without or with less combination of optical films, and it substantially reduces the manufacturing costs of the backlight module.

From the foregoing description, by changing the relative positions of the display panel and the backlight module, the LCD and the manufacturing method thereof of the present invention minimize the phenomenon of asymmetrical light field and improve the display quality of the LCD; meanwhile, the lower arranging costs solves the technical problems of worse display quality resulting from the phenomenon of asymmetrical light field in the LCD with the traditional side-light type backlight module.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A liquid crystal display (LCD), comprising a backlight module and a display panel, the backlight module comprising an optical film, wherein there is an included angle $\theta_{pb}$, which is larger than zero degrees, between a direction substantially perpendicular to a longest surface of the optical film and a normal direction of a light emission surface of the display panel; wherein the included angle $\theta_{pb}$ is less than or equal to a light emission angle $\theta_{max}$; wherein the light emission angle $\theta_{max}$ is an included angle between a corresponding light emission direction of a maximum luminosity on a light emission surface of the optical film of the backlight module and the direction substantially perpendicular to a longest surface of the optical film of the backlight module; wherein an included angle $\theta_{mp}$ between the corresponding light emission direction of the maximum luminosity and the normal direction of the light emission surface of the display panel is $\theta_{max}-\theta_{pb}$.

2. The LCD according to claim 1, wherein the optical film comprises a diffuser film, a dual brightness enhancement film, a prism film, a microlens film and/or a lenticule film.

3. A liquid crystal display (LCD), comprising a backlight module and a display panel, the backlight module comprising an optical film, wherein there is an included angle $\theta_{pb}$, which is larger than zero degrees, between a direction substantially perpendicular to a longest surface of the optical film of the backlight module and a normal direction of a light emission surface of the display panel; wherein the included angle $\theta_{pb}$ is less than or equal to a light emission angle $\theta_{max}$; wherein the light emission angle $\theta_{max}$ is an included angle between a corresponding light emission direction of a maximum luminosity on a light emission surface of the optical film of the backlight module and the direction substantially perpendicular to a longest surface of the optical film of the backlight module.

4. The LCD according to claim 3, wherein an included angle $\ominus_{mp}$ between the corresponding light emission direction of the maximum luminosity of the light emission surface of the backlight module and the normal direction of the light emission surface of the display panel is $\ominus_{max}-\ominus_{pb}$.

5. The LCD according to claim 3, wherein the optical film comprises a diffuser film, a dual brightness enhancement film, a prism film, a microlens film and/or a lenticule film.

6. A method for manufacturing a LCD, wherein the LCD comprises a backlight module and a display panel, the backlight module comprising an optical film; the method for manufacturing the LCD comprises a step of: (A) setting an included angle $\theta_{pb}$, which is larger than zero degrees, between a direction substantially perpendicular to a longest surface of the optical film of the backlight module and a normal direction of a light emission surface of the display panel; wherein the included angle $\theta_{pb}$ is less than or equal to a light emission angle $\theta_{max}$, wherein the light emission angle $\theta_{max}$ is an included angle between a corresponding light emission direction of a maximum luminosity on a light emission surface of the optical film of the backlight module and the direction substantially perpendicular to a longest surface of the optical film of the backlight module.

7. The method for manufacturing a LCD according to claim 6, wherein an included angle $\ominus_{mp}$ between the corresponding light emission direction of the maximum luminosity of the light emission surface of the backlight module and the normal direction of the light emission surface of the display panel is $\ominus_{max}-\ominus_{pb}$.

8. The method for manufacturing a LCD according to claim claim 6, wherein the optical film comprise a diffuser film, a dual brightness enhancement film, a prism film, a microlens film and/or a lenticule film.

* * * * *